US006808590B1

(12) United States Patent
Gotkis et al.

(10) Patent No.: US 6,808,590 B1
(45) Date of Patent: Oct. 26, 2004

(54) METHOD AND APPARATUS OF ARRAYED SENSORS FOR METROLOGICAL CONTROL

(75) Inventors: Yehiel Gotkis, Fremont, CA (US); Rodney Kistler, Los Gatos, CA (US); Aleksander Owczarz, San Jose, CA (US); David Hemker, San Jose, CA (US); Nicolas J. Bright, San Jose, CA (US)

(73) Assignee: Lam Research Corporation, Fremont, CA (US)

( * ) Notice: Subject to any disclaimer, the term of this patent is extended or adjusted under 35 U.S.C. 154(b) by 0 days.

(21) Appl. No.: 10/186,932

(22) Filed: Jun. 28, 2002

(51) Int. Cl.[7] ................ H01L 21/302; G01R 27/00
(52) U.S. Cl. .................. 156/345.16; 324/71.5
(58) Field of Search .............. 156/345.16; 324/71.5, 324/230, 234, 671

(56) References Cited

U.S. PATENT DOCUMENTS

| 3,815,016 A | 6/1974 | Nix et al. ............ 324/34 |
| 4,556,845 A | 12/1985 | Strope et al. |
| 5,473,247 A | 12/1995 | You et al. ............ 324/227 |
| 5,485,082 A | 1/1996 | Wisspeintner et al. ...... 324/202 |
| 5,559,428 A | 9/1996 | Li et al. |
| 5,660,672 A * | 8/1997 | Li et al. ............ 156/345.13 |
| 5,731,697 A | 3/1998 | Li et al. |
| 5,889,401 A | 3/1999 | Jourdain et al. |
| 6,072,313 A | 6/2000 | Li et al. |
| 6,563,308 B2 | 5/2003 | Nagano et al. ............ 324/230 |

* cited by examiner

Primary Examiner—Gregory Mills
Assistant Examiner—Sylvia R. MacArthur
(74) Attorney, Agent, or Firm—Martine & Penilla, LLP (57) ABSTRACT

A system for processing a wafer is provided. The system includes a chemical mechanical planarization (CMP) tool. The CMP tool includes a wafer carrier defined within a housing. A carrier film is affixed to the bottom surface and supports a wafer. A sensor embedded in the wafer carrier. The sensor is configured to induce an eddy current in the wafer to determine a proximity and a thickness of the wafer. A sensor array external to the CMP tool is included. The sensor array is in communication with the sensor embedded in the wafer carrier and substantially eliminates a distance sensitivity. The sensor array provides an initial thickness of the wafer to allow for a calibration to be performed on the sensor embedded in the wafer carrier. The calibration offsets variables causing inaccuracies in the determination of the thickness of the wafer during CMP operation. A method and an apparatus are also provided.

18 Claims, 10 Drawing Sheets

METHOD AND APPARATUS OF ARRAYED SENSORS FOR METROLOGICAL CONTROL

CROSS REFERENCE TO RELATED APPLICATION

This application is related to U.S. patent application Ser. No. 10/186472 (Attorney Docket No. LAM2P357), filed on the same day as the instant application and entitled "INTEGRATION OF EDDY CURRENT SENSOR BASED METROLOGY WITH SEMICONDUCTOR FABRICATION TOOLS." The disclosure of this related application is incorporated herein by reference.

BACKGROUND OF THE INVENTION

The invention relates generally to semiconductor fabrication and more specifically to in-line metrology for process control during wafer processing.

During semiconductor fabrication a there are multiple steps where an underlying substrate is subjected to the formation and removal of various layers. The small feature sizes, tight surface planarity requirements, combined with the constant quest to increase throughput, makes it highly desirable to stop the process when the correct thickness has been achieved, i.e., when an endpoint has been obtained for the process step.

Eddy current sensors are used for displacement, proximity and film thickness measurements. The sensors rely on the induction of current in a sample by the fluctuating electromagnetic field of a test coil proximate to the object being measured. Fluctuating electromagnetic fields are created as a result of passing an alternating current through the coil. The fluctuating electromagnetic fields induce eddy currents which perturb the applied field and change the coils inductance.

Figure 1:
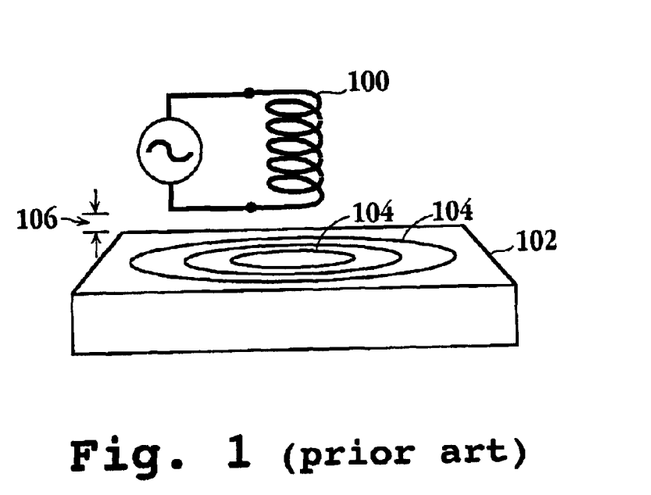
FIG. 1 is a simplified schematic diagram of the principle upon which an eddy current sensor operates.

FIG. 1 is a simplified schematic diagram of the principle upon which an eddy current sensor operates. An alternating current flows through coil 100 in close proximity to conducting object 102. The electromagnetic field of the coil induces eddy currents 104 in conducting object 102. The magnitude and the phase of the eddy currents in turn effect the loading on the coil. Thus, the impedance of the coil is impacted by the eddy currents. This impact is measured to sense the proximity of conducting object 102 as well as a thickness of the object. Distance 106 impacts the effect of eddy currents 104 on coil 100, therefore, if object 1002 moves, the signal from the sensor monitoring the impact of eddy currents on coil 100 will also change.

Figure 2:
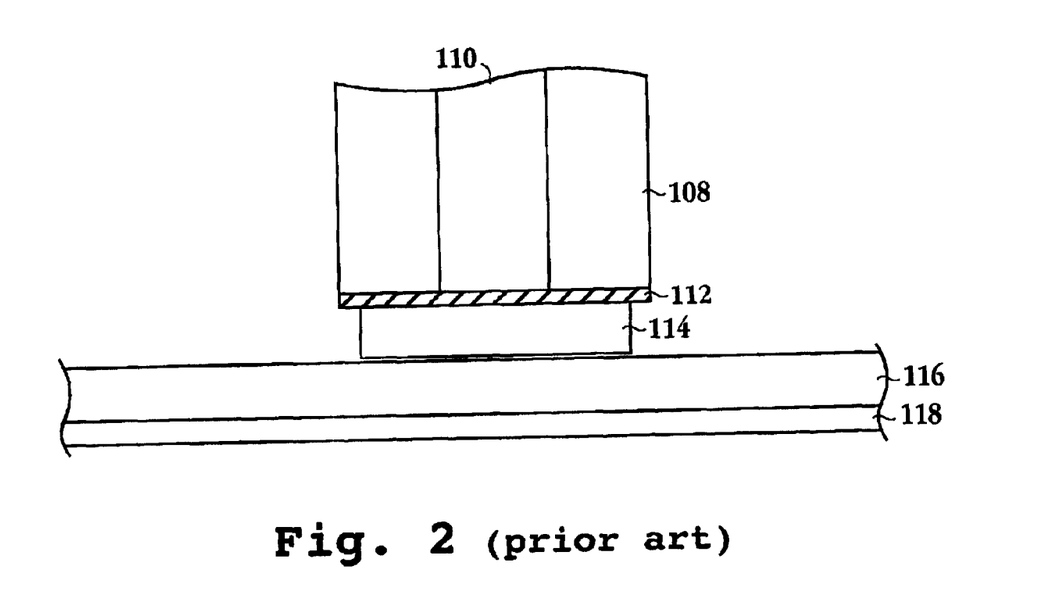
FIG. 2 is a schematic diagram of a wafer carrier having an eddy current sensor for measuring the thickness of a wafer during a chemical mechanical planarization process (CMP).

Attempts to use eddy current sensors to measure thickness of a film has resulted in limited success. Since the signal from the eddy current sensor is sensitive to both the thickness of the film and distance of the substrate to the sensor, there are two unknowns that must be resolved. FIG. 2 is a schematic diagram of a wafer carrier having an eddy current sensor for measuring the thickness of a wafer during a chemical mechanical planarization process (CMP). Wafer carrier 108 includes eddy current sensor 110. During a CMP operation, wafer 114 supported by carrier film 112 of carrier 108 is pressed against pad 116 to planarize a surface of the wafer. Pad 116 is supported by stainless steel backing 118.

One shortcoming of the configuration of FIG. 2 comes from the variability of the carrier film, which can vary by +/−3 mils. Thus, the carrier film causes a substantial variability in the distance between the wafer and the sensor. Additionally, different down forces applied to the carrier film will cause further variation as the carrier film compresses. Accordingly, it becomes extremely difficult to calibrate for all the variables that effect the distance, which in turn impacts the thickness measurement of the sensor. Another shortcoming of this configuration is caused by the presence of another conducting material separate from the conducting material being measured and is commonly referred to as a third body effect. If the thickness of the conductive layer is less than the so-called skin depth, the electromagnetic field from the coil will not be completely absorbed and will partially pass through to stainless steel backing 118 of pad 116 of FIG. 2. It will induce additional eddy currents within the stainless steel belt, thereby contributing to the total signal from the eddy current sensor. Furthermore, it should be appreciated that the pad wears or erodes over time, causing variation in the distance between the stainless steel backing and the eddy current sensor, which influences the appropriated contribution to the total eddy current sensor signal. Thus, a wear factor has to be considered as the wafers are continuously being processed. Consequently, due to the variability injected into the thickness measurement, the amount of error is unacceptably high and unpredictable.

In view of the foregoing, there is a need to eliminate or offset the variability inherent under working conditions so that an accurate endpoint can be determined to more precisely achieve a desired thickness.

SUMMARY OF THE INVENTION

Broadly speaking, the present invention fills these needs by determining a thickness of the wafer under ideal conditions, i.e., non-working conditions, and providing that thickness so that the variability due to unknowns introduced during the processing operation can be accounted for or offset.

In accordance with one embodiment of the present invention, a method for determining an endpoint thickness for a chemical mechanical planarization (CMP) operation, is provided. The method initiates with providing a first sensor external to the CMP module. Then, a thickness of a wafer is detected with the first sensor. Next, the thickness of the wafer is supplied to a second sensor in the CMP module. Then, the second sensor is calibrated with the thickness of the wafer. Next, CMP operating parameters are adjusted based on a signal from the second sensor in order to optimize a CMP operation for the wafer.

In another embodiment, an apparatus for supporting a wafer during a chemical mechanical planarization (CMP) operation is provided. The apparatus includes a wafer carrier defined within a housing. The wafer carrier has a bottom surface. A carrier film is affixed to the bottom surface. The carrier film is configured to support a wafer during CMP operations. A sensor is embedded in the wafer carrier such that a bottom surface of the wafer carrier is aligned with a bottom surface of the sensor, or a window, made of nonconductive material, aligned with the bottom surface of the carrier is introduced in front of the sensor. The sensor is configured to induce an eddy current in the wafer to determine a signal which is defined by proximity and a thickness of the wafer as the wafer is forced against a polishing pad. For a given proximity, the sensor is configured to receive an incoming thickness of the wafer to offset an inaccuracy of the sensor due to both a non-uniformity of the carrier film and polishing pad erosion.

In accordance with yet another embodiment of the present invention, a system for processing a wafer is provided. The system includes a chemical mechanical planarization (CMP)

tool. The CMP tool includes a wafer carrier defined within a housing, where the wafer carrier has a bottom surface. A carrier film is affixed to the bottom surface. The carrier film is configured to support a wafer during CMP operations. A sensor is embedded in the wafer carrier such that a bottom surface of the wafer carrier is aligned with the bottom surface or a separating non-conductive spacer, aligned with the bottom surface is introduced. The sensor is configured to induce an eddy current in the wafer to determine a proximity and a thickness of the wafer. A sensor array external to the carrier is included, performing film thickness measurements in non-disturbing conditions. The sensor array is in communication with the sensor embedded in the wafer carrier. The sensor array is configured to substantially eliminate a distance sensitivity. The sensor array is configured to provide an initial thickness of the wafer. The initial thickness of the wafer allows for a calibration to be performed on the sensor embedded in the wafer carrier. The calibration offsets variables causing inaccuracies in the determination of the thickness of the wafer during CMP operation.

It is to be understood that the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate exemplary embodiments of the invention and together with the description serve to explain the principles of the invention.

DETAILED DESCRIPTION OF THE PREFERRED EMBODIMENTS

Several exemplary embodiments of the invention will now be described in detail with reference to the accompanying drawings. FIGS. 1 and 2 are discussed above in the "Background of the Invention" section.

Eddy current sensors (ECS) allow for measuring a metal film thickness of a moving wafer. It has been determined that ECS are capable of providing a fast enough response for a wafer moving under typical loading robotics velocity. Therefore, it is possible to perform the thickness measurements "on the fly" without impacting process throughput. Moreover, the movement of the wafer can be taken advantage of to produce a thickness profile from a limited number of sensors in a cluster configuration. For example, wafer aligners provide movement in a rotational direction and a linear radial direction. Accordingly, a cluster of sensors can capture a thickness profile of a wafer while the wafer is undergoing common automated wafer handling schemes. In one embodiment, a thickness profile can be generated for each wafer so that a recipe of a downstream process can be optimized for the thickness profile.

The Figures below initially provide configurations for an incoming sensor or sensor cluster that determines the thickness of a wafer under non-process conditions, i.e., non-disturbing conditions. This thickness can then be stored and/or communicated to downstream fabrication processes dealing with thin metal films. That is, the incoming thickness can be supplied to a similar thickness measuring device for the downstream fabrication process. The sensor associated with the downstream fabrication process can then be calibrated with the incoming thickness to make the unknowns or variables resulting from the processing conditions irrelevant. It should be appreciated that a cluster of sensors refers to the combination of two or three sensors to define a new metrological property. In one embodiment, the sensors are joined into clusters to remove sensitivity to distance. Sample results of data gathered with the sensor configurations are also provided herein. An array of sensors as used herein includes two or more clusters of sensors joined to cover, i.e., map, a larger area of a wafer. Additionally, three sensors located on the same side of a wafer can be considered an array.

When integrating the clustered sensor with a preexisting station the thickness of the wafer can be mapped and stored for a downstream processing operation. In addition, when the wafers are removed from the processing chamber the thickness of the processed wafer can also be scanned to provide feedback as to the results of the processing operation. Accordingly, adjustments can be made to the recipe of the operation based on the feedback. Of course, the post processing results can be provided for further processing operations also.

Figure 3:
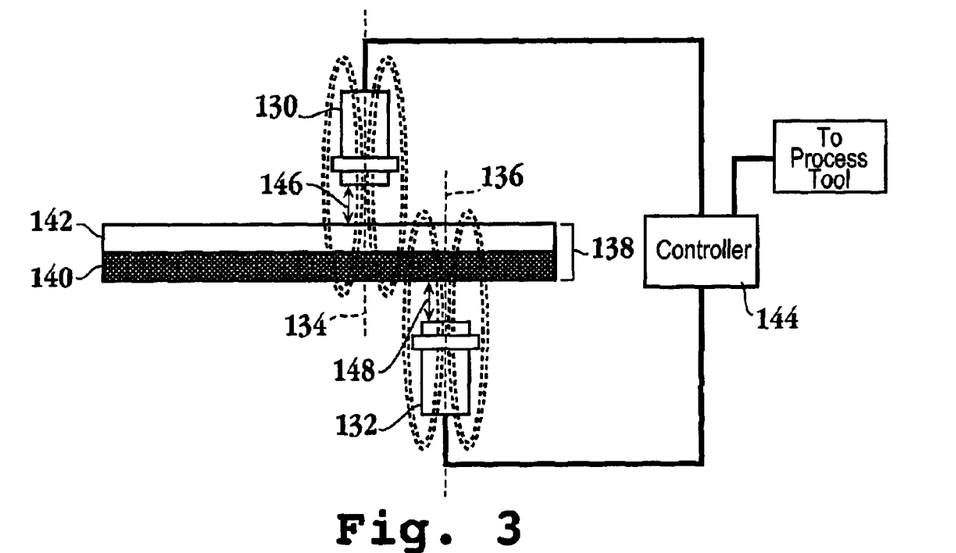
FIG. 3 is a simplified schematic diagram of coupled sensors for measuring thickness of an incoming wafer in accordance with one embodiment of the invention.

FIG. 3 is a simplified schematic diagram of coupled sensors for measuring thickness of an incoming wafer in accordance with one embodiment of the invention. Top sensor 130 and bottom sensor 132 are configured to provide a signal indicating a thickness of wafer 138. In one embodiment, sensors 130 and 132 are eddy current sensors. Wafer 138 includes substrate 142 and metal layer 140. Axis 134 of top sensor is offset from axis 136 of bottom sensor 132. One skilled in the art will appreciate that by offsetting top sensor 130 and bottom sensor 132, where both sensors are eddy current sensors, the electromagnetic field produced by sensors 130 and 132 will not interfere, i.e., suppress each other. Where the frequencies are the same and axis 134 is aligned with axis 136 then suppression of the signals can occur in certain situations, however, as will be explained below adjustments can be made to avoid suppression of the signals. Controller 144 is in communication with sensors 132 and 134. In one embodiment, controller 144 is configured to receive signals from sensors 132 and 134 and determine a thickness of wafer 138. It should be appreciated that controller 144 averages the signals from sensor 130 and 132 to arrive at a signal indicating a thickness of the wafer. Furthermore, by providing top sensor 130 and bottom sensor 132 a change in distance 146 between the top sensor and a top surface of wafer 138 or a change in distance 148 between the bottom sensor and a bottom surface of wafer 138 are cancelled out. That is, a change in either distance when both the sensors are stationary is offset by the averaging of the readings so that the signal is now a function of thickness rather than thickness and proximity. In another embodiment, controller 144 communicates the calculated thickness to a downstream tool, such as a CMP tool, so that the downstream process can optimize the process settings, such as pressure of the down force applied and belt speed, based upon the incoming thickness of the wafer.

Figure 4:
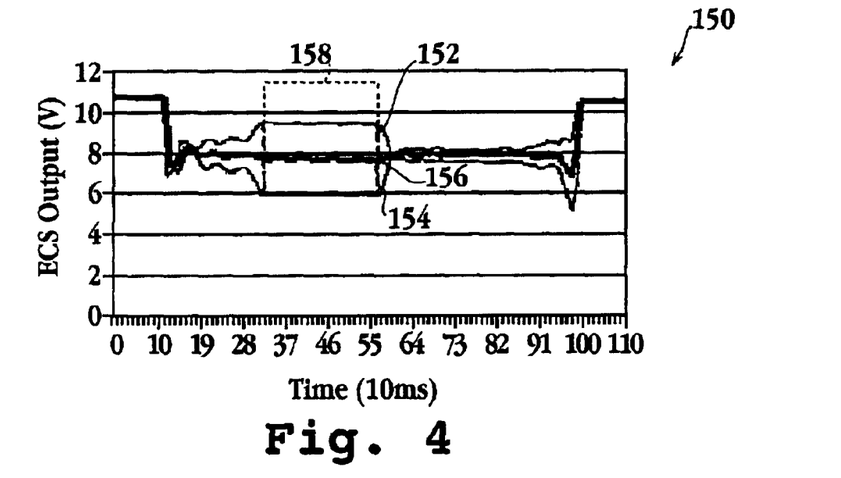
FIG. 4 is a graph of the signal of coupled eddy current sensors configured as in FIG. 3 in accordance with one embodiment of the invention.

FIG. 4 is a graph of the signal from coupled eddy current sensors configured as in FIG. 3 in accordance with one embodiment of the invention. Graph 150 plots an eddy current sensor output in volts versus time. Line 152 represents the signal from a sensor located below a wafer such as bottom sensor 132 of FIG. 3. Line 154 represents the signal from a sensor located above the wafer such as top sensor 130 of FIG. 3. Bold line 156 represents the average of lines 152 and 154. It will be apparent to one skilled in the art that line 156 provides a substantially constant signal. That is, by combining a signal from the top sensor with a signal from a bottom sensor, the dependence of the signal on the distance of the sensor is eliminated. For example, as wafer 138 of FIG. 3 moves closer to top sensor 130, the signal increases. Region 158 exemplifies the movement of the wafer closer to the top sensor. Thus, the signal intensity from the top sensor increases accordingly as illustrated by line 152 in region 158. At the same time, the wafer is moving away from the bottom sensor. Therefore, the signal intensity from the bottom sensor decreases similar to the increase of the signal intensity from the top sensor, as illustrated by line 154 in region 158. Consequently, an average of the top and bottom signal intensity stays constant. Since the signal intensity is linearly related to the distance of the sensor to the object, a change in signal intensity caused by movement of the object toward a first stationary sensor is offset by an opposite change in intensity caused by movement of the object away from a second stationary sensor. In turn, the sensitivity of the signal intensity to distance is eliminated.

Thus, by clustering a sensor or clusters of sensors with a sensor operating under working conditions, such as a sensor embedded in a wafer carrier of a CMP tool, the sensor operating under working conditions can be calibrated to more accurately provide information regarding the removal rate and process endpoint. That is, an accurate measurement of an incoming film thickness or wafer thickness is provided so that inaccuracies caused under processing conditions can be compensated through a calibration setting. Furthermore, the sensor cluster can be utilized as a run-to-run process control where a wafer has a thickness profile that is mapped by a first sensor or cluster of sensors and the profile is downloaded into a controller of the process tool to customize the process, such as a CMP process, to remove the correct amount of film thickness.

Figure 5:
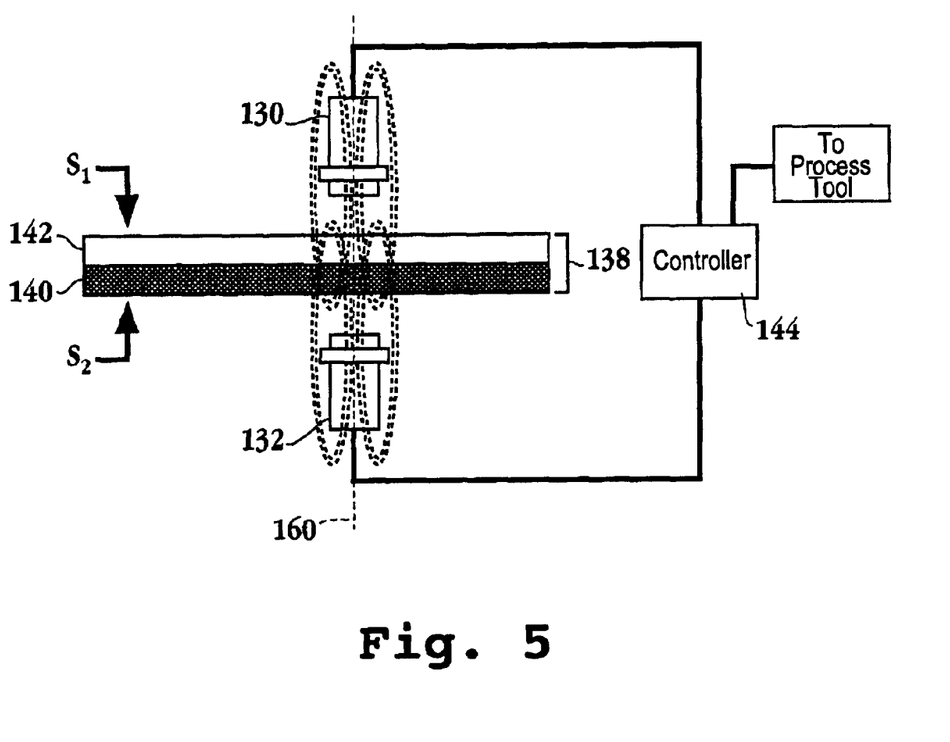
FIG. 5 is a simplified schematic diagram of an alternative configuration of coupled sensors for measuring an incoming thickness of a wafer or film in accordance with one embodiment of the invention.

FIG. 5 is a simplified schematic diagram of an alternative configuration of coupled sensors for measuring an incoming thickness of a wafer or film in accordance with one embodiment of the invention. Here, top sensor 130 and bottom sensor 132 share the same vertical axis 160. In order to eliminate any interference or suppression of the signals between the top and bottom sensors a different frequency can be applied for each of the respective sensors. Additionally, a phase shift can be applied so that the two sensors are out of phase. That is, one sensor overturns a wave of the signal by 180 degrees to eliminate suppression of the signal. Since distance is eliminated as a variable here as described above, the signal intensity is a function of thickness. Stated as a mathematical equation: S=k(THK), where S is the signal intensity, k is the sensitivity coefficient and THK is the thickness. Where the signal intensity and the sensitivity coefficient are known for the above equation, the thickness can be determined through a calibration curve, in one embodiment. This determined thickness can be supplied to a downstream process tool dealing with thin metal films in a semiconductor fabrication process, such as a CMP tool as discussed with reference to FIGS. 8 and 9.

Figure 6A:
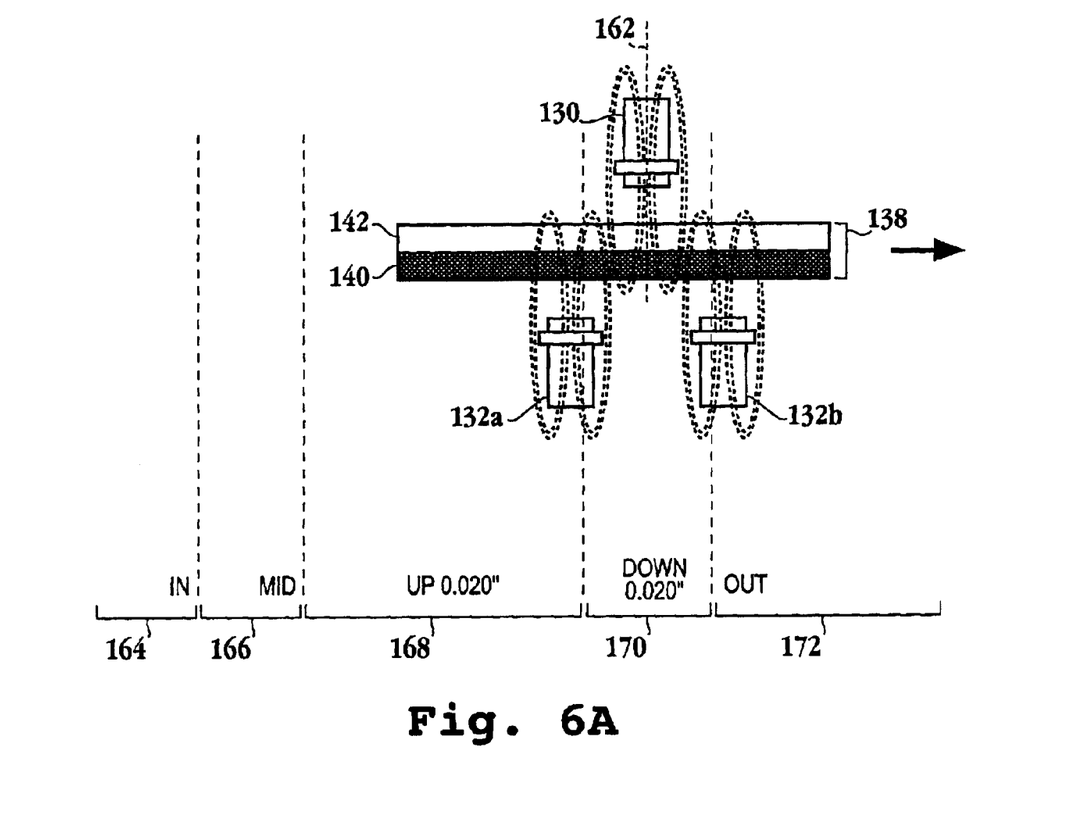
FIG. 6A is a simplified schematic diagram of another alternative configuration of coupled sensors for measuring thickness of an incoming wafer in accordance with one embodiment of the invention.

FIG. 6A is a simplified schematic diagram of another alternative configuration of coupled sensors for measuring thickness of an incoming wafer in accordance with one embodiment of the invention. In this embodiment, the sensor cluster is configured to determine the thickness of wafer 138 along axis 162 of top sensor 130. Bottom sensors 132a and 132b are positioned such that a distance from each sensor to axis 162 is the same. Thus, by averaging the signals from sensors 132a and 132b, the signal, and consequently the thickness, along axis 162 is determined. Here, interference or suppression of the signals between the top and bottom sensors is not a concern as bottom sensors 132a and 132b are offset from an axis of top sensor 130. Regions 164, 166, 168, 170 and 172 denote movement of wafer 138 as the wafer passes through a space defined between top sensor 130 and bottom sensors 132a and 132b. The significance of these regions are described in greater detail with reference to FIG. 6B.

Figure 6B:
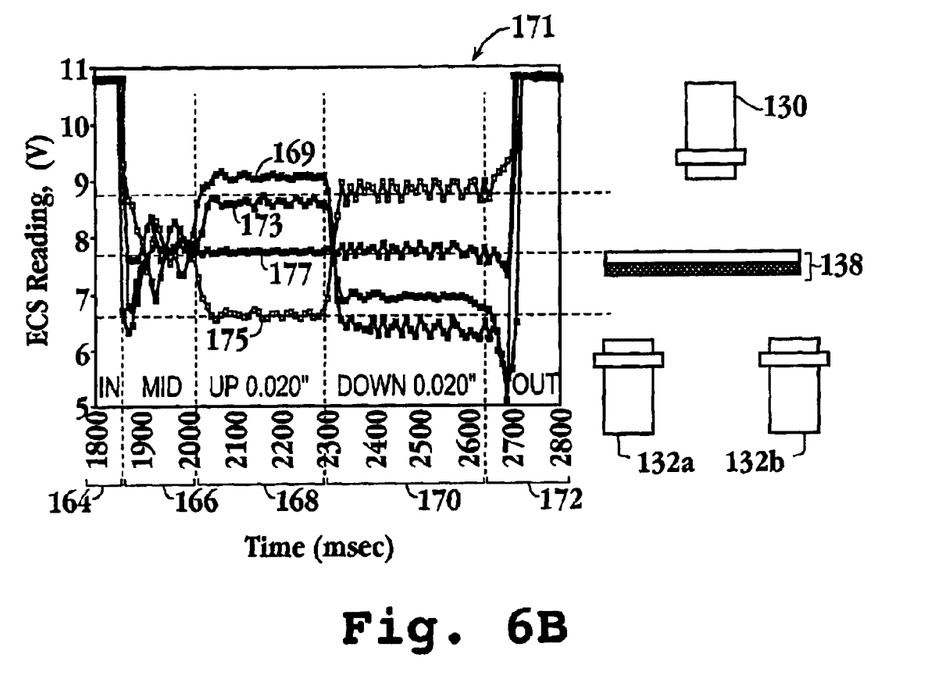
FIG. 6B is a graph illustrating the stability of an average signal when using an eddy current sensor array as configured to the side of the graph for detecting a film thickness in accordance with one embodiment of the invention.

FIG. 6B is a graph illustrating the stability of an average signal when using an eddy current sensor cluster as configured to the side of the graph for detecting a film thickness in accordance with one embodiment of the invention. In this configuration, eddy current sensor cluster includes a top sensor 130 and two bottom sensors 132a and 132b. Wafer 138 travels between top sensor 130 and bottom sensors 132a and 132b. Graph 171 plots the ECS readings in volts versus the time in milliseconds. Line 169 represents the reading from sensor 132a, while line 173 represents the reading from sensor 132b. Line 175 represents the reading from top sensor 130. In one embodiment, the signals from sensors 132a and 132b are averaged. This result is then averaged with the signal from sensor 130. The final averaged signal is represented by line 177. Graph 171 illustrates the various positions of wafer 138 as it passes through the sensor cluster. For example, wafer 138 comes into the sensor cluster and is represented on the graph by region 164. It should be appreciated that the ECS reading of 11 volts represents a starting point corresponding to a thickness of 0 as the wafer is not being measured here. The signals stabilize as the wafer edge passes through the sensor,cluster. Then, the wafer continues along this midpoint travel path as represented in region 166. As can be seen, the average reading represented by line 177 stays relatively steady.

Next, the wafer is moved up by 0.020 inches. While the signal intensity, i.e., a difference between the measured signal and the reference signal at 0 thickness, from top sensor 130 becomes stronger, the signal intensity from bottom sensors 132a and 132b becomes weaker. However, the average represented by line 177 remains relatively constant. The wafer is then moved down 0.020 inches from the midpoint path. Accordingly, the signal intensity from top sensor 130 becomes weaker, while the signal intensity from bottom sensors 132a and 132b becomes stronger. As above, the average of the top sensor signal and the bottom sensor signal remains relatively constant. Thus, as mentioned above, the sensor cluster supplies a stable signal where the distance of the wafer from the sensor is irrelevant as the average of a top and bottom signal offsets variability from the wafer moving or even variation of the signal from wafer warping. Wafer 138 then moves out of the sensor cluster as depicted in region 172 where the signals vary as the sensors see the edge of the wafer upon exit. It should be appreciated that regions 164–172 of FIG. 6A represent a similar pattern of movement as described with respect to FIG. 6B. A graph of the movement of FIG. 6A would yield a substantially constant average signal as in FIG. 6B. One skilled in the art will appreciate that the sensors can be configured with one bottom sensor and one top sensor, one bottom sensor and two bottom sensors, or any other suitable configuration to offset the movement of the wafer so that a stable reading is maintained.

Figure 7A:
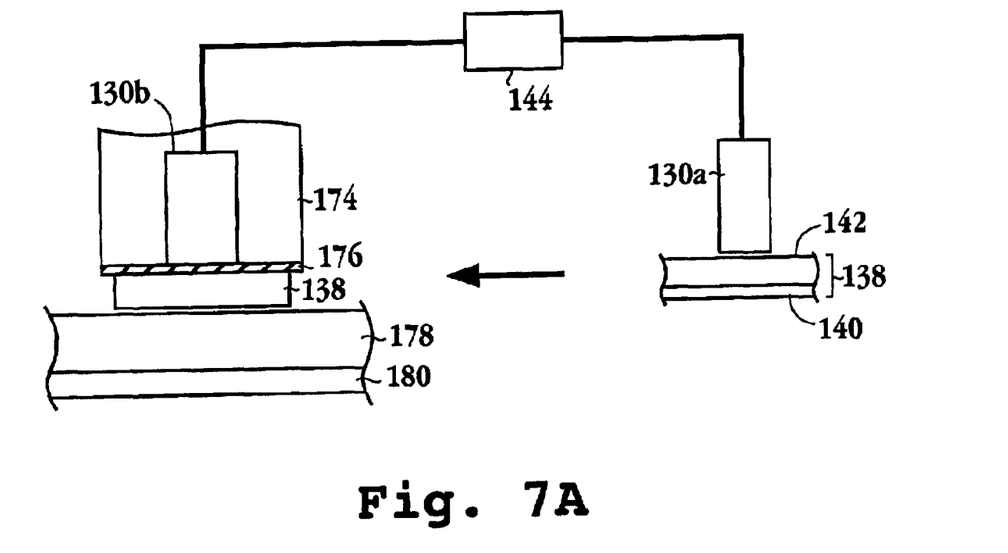
FIG. 7A is a simplified schematic diagram of an incoming thickness sensor coupled to a downstream CMP process thickness sensor in accordance with one embodiment of the invention.

FIG. 7A is a simplified schematic diagram of an incoming thickness sensor coupled to a downstream CMP process thickness sensor in accordance with one embodiment of the invention. Here, incoming thickness sensor 130a determines a thickness of the wafer and/or thin film 140 over substrate 142 of wafer 138. The signal indicating the determined thickness is communicated to controller 144. In turn, controller 144 communicates the signal to sensor 130b, which is embedded in wafer carrier 174 for a CMP process. In one embodiment sensors 130a and 130b are eddy current sensors. In another embodiment, sensors 130a and 130b are infrared sensors. It should be appreciated that by providing sensor 130b with the thickness of incoming wafer 138, a calibration can be performed to substantially eliminate the sensitivity to the distance between the sensor and the wafer. The variability in the distance between sensor 130b and wafer 138 can be caused by carrier film 176 compressing during working conditions or just due to the inherent variation of the thickness of the carrier film, which can be as great as +/−3 millimeters. Additionally, the distance between the top of polishing pad 178 and stainless steel backing 180 impacts the signal from sensor 130b. Again, the signal indicating the thickness of incoming wafer 138 can be used to calibrate sensor 130b to substantially eliminate variability caused by polishing pad tolerances and pad erosion that impact the distance between the top of polishing pad 178 and stainless steel backing 180.

Figure 7B:
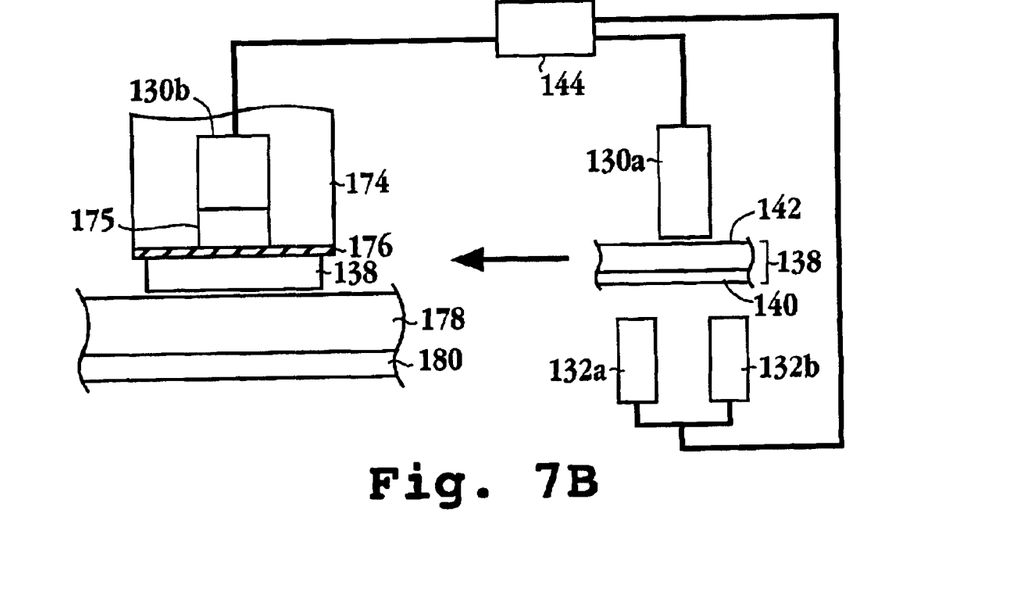
FIG. 7B is a simplified schematic diagram of an alternative embodiment of an incoming thickness sensor coupled to a downstream CMP process thickness sensor.

FIG. 7B is a simplified schematic diagram of an alternative embodiment of an incoming thickness sensor coupled to a downstream CMP process thickness sensor. In FIG. 7B, a sensor cluster consisting of top sensor 130a and bottom sensors 132a and 132b, is in communication with controller 144. Here, a suitable sensor cluster, such as the sensor cluster of FIGS. 6A and 6B, is provided to determine the incoming thickness of wafer 138 or of thin film 140 of the wafer. One skilled in the art will appreciate that the sensor cluster with reference to FIGS. 3 and 5 are suitable sensor clusters that can also be used to determine the thickness of wafer 138. In one embodiment, controller 144 averages the signal from bottom sensors 132a and 132b in order to determine a thickness signal for the thickness of wafer 138 along an axis of top sensor 130a through the wafer. The averaged signal of the bottom sensors is then averaged with the signal from top sensor 130a to determine a thickness of wafer 138 or thin film 140. This thickness is then communicated to embedded sensor 130b. As mentioned above with reference to FIG. 7A, an auto calibration can be performed for sensor 130b where the sensitivity to the distance between the sensor and wafer 138 and the sensitivity to the distance between the top of polishing pad 178 and stainless steel backing 180 are substantially eliminated. That is, the auto calibration can be performed in real-time to adjust the ECS readout for variation in sensor proximity due to pad-wear or other mechanical drift issues with the CMP carrier-to-plates mechanical displacements.

Sensor 130b of FIG. 7B is disposed over spacer 175. Spacer 175 is aligned with the bottom surface of wafer carrier 174. Spacer 175 is composed of any suitable material that is non-conductive. In one embodiment, spacer 175 is a polymer. In another embodiment, spacer 175 is between about 1 millimeter (mm) and about 1.5 mm thick. It should be appreciated that spacer 175 provides a window for sensor 130b to transmit and receive signals indicating the thickness and proximity of a wafer or film on a wafer.

While the embodiments of FIGS. 7A and 7B illustrate a sensor or sensor cluster for pre-CMP processing, a sensor or sensor cluster can also be located post CMP processing to provided information configured to improve run-to-run process control. While the incoming thickness allows for specific recipes to be downloaded to the process tool station to compensate for any incoming film thickness, the post CMP thickness allows for the correction of any detected process variation determined in the post-CMP thickness uniformity measurement. That is, the post-CMP thickness uniformity measurement is provided as feedback to sensor 130b, in order for sensor 130b to further fine tune the calibration settings to obtain an accurate endpoint. In one embodiment, controller 144 provides the feedback to sensor 130b from a post-CMP sensor cluster. In another embodiment, the eddy current sensors are commonly available eddy current sensors, such as GP-A series analog displacement sensors available from SUNX Limited. In another embodiment, multiple sensors can be placed in the wafer carrier of FIGS. 7A and 7B. The multiple sensors can be linked together to detect both wafer proximity and metal film-thickness. For example, a capacitance sensor can be included in the wafer carrier to determine a distance between the wafer and the ECS sensor. As the capacitance sensor is linked to the ECS sensor, the distance can be provided to the ECS sensor.

Figure 8A:
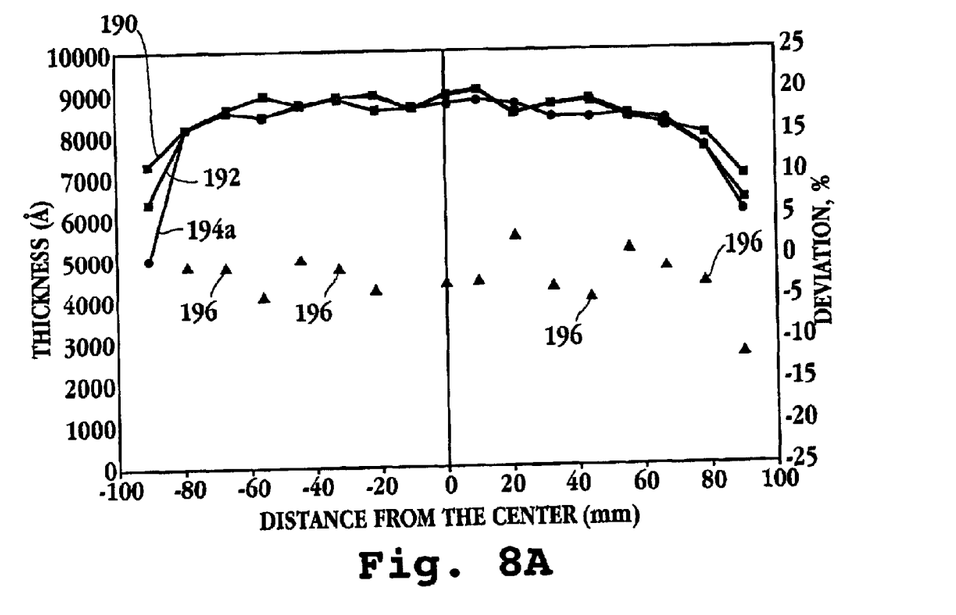
FIGS. 8A and 8B are graphs illustrating the correlation between the signal from an eddy current sensor for a film thickness and a signal from a standard resistivity film thickness measurement device in accordance with one embodiment of the invention.
Figure 8B:
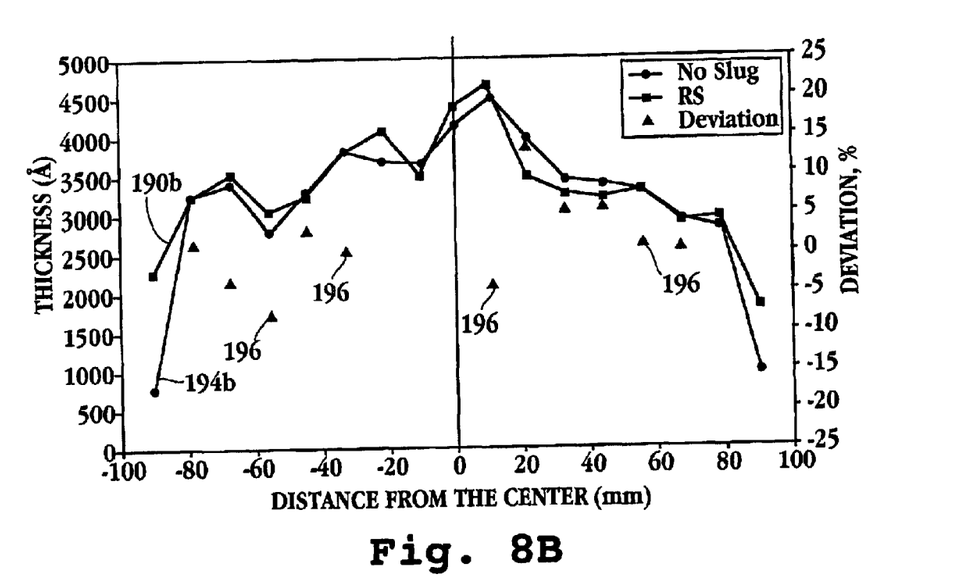

FIGS. 8A and 8B are graphs illustrating the correlation between the signal from an eddy current sensor for a film thickness and a signal from a standard resistivity film thickness measurement device in accordance with one embodiment of the invention. Line 190 of FIG. 8A represents the signal from a typical resistance sensor approach. Line 192 represents the signal from an eddy current sensor in the presence of a third metal body, such as the stainless steel backing of a polishing pad or belt, a wafer carrier, an air bearing platen, etc, of a CMP tool, at different points from the center of the wafer. Line 194a represents the signal from an eddy current sensor without the presence of a third metal body. Thus, the eddy current sensor closely correlates with the signals from a standard four point approach of the resistance measurement. Additionally, the percent deviation is within +/−5%, as illustrated by triangles 196, where each of the triangles corresponds to a difference between respective points on the lines above each of the triangles.

FIG. 8B similarly illustrates eddy current sensor measurements correlated to signals from a typical resistance sensor approach. Here, line 190b represents the signal from a typical resistance sensor approach, while 194b represents the signal from an eddy current sensor without the presence of a third metal body. It should be appreciated that the wafer measured in FIG. 8A is different than the wafer measure in FIG. 8B. Again the ECS signal 194b closely correlates with the RS75 signal. That is, the percent deviation between the signals is generally within +/−5% as illustrated by triangles 196. One skilled in the art will appreciate that the points at the ends of the lines correspond to the edge of the film, i.e., edge of the wafer, and are not considered as relevant.

Figure 9:
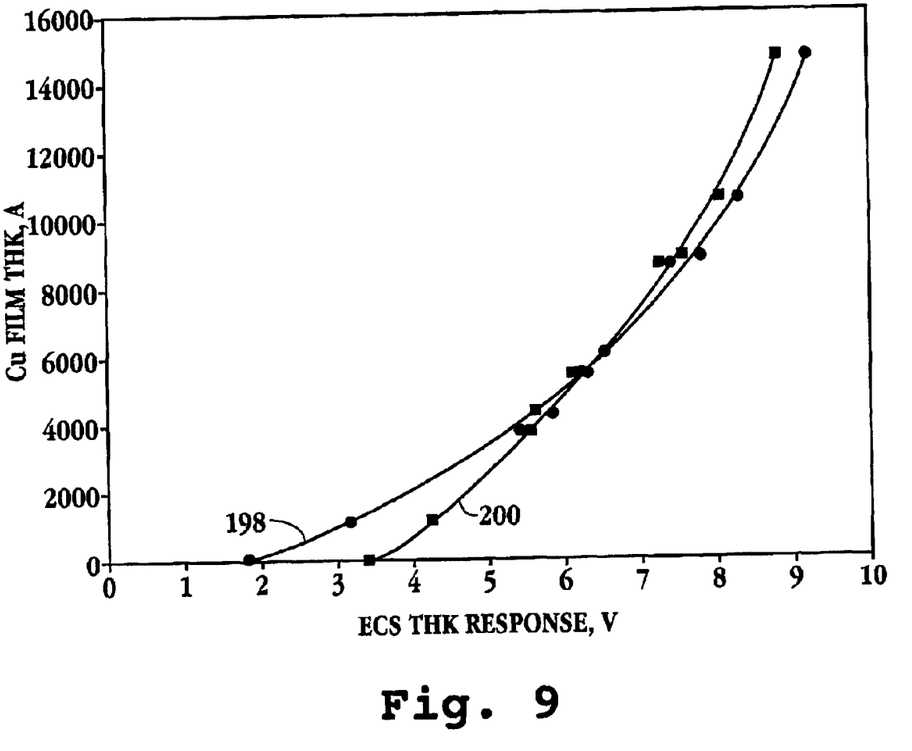
FIG. 9 is a graph illustrating a calibration curve for an eddy current sensor for measuring a copper film thickness in accordance with one embodiment of the invention.

FIG. 9 is a graph illustrating a calibration curve for an eddy current sensor for measuring a copper film thickness in accordance with one embodiment of the invention. Line 198 represents a film thickness of copper and the associated ECS voltage reading for that thickness without the presence of a third metal body. Line 200 represents a film thickness of copper and the associated ECS voltage reading for that thickness in the presence of a third metal body. One skilled in the art will appreciate that the calibration curves can be applied to the sensors described above with reference to FIGS. 3, 5, 6A, 6B, 7A and 7B. Additionally, calibration curves can be generated for any conductive film layer, as copper is described here for illustrative purposes only and not meant to be limiting.

Figure 10:
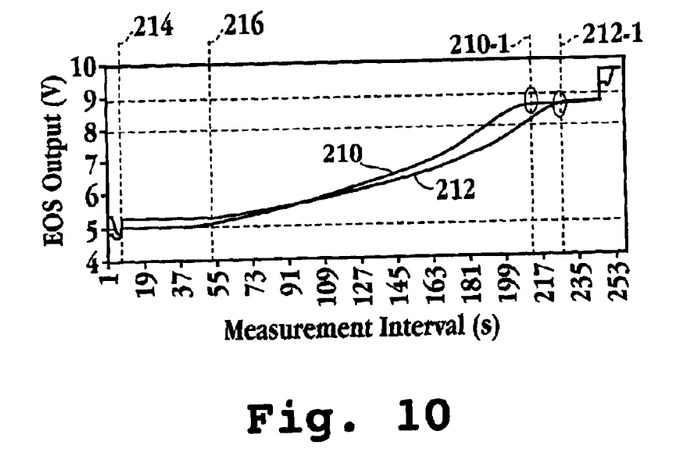
FIG. 10 is a graph illustrating two eddy current sensor output signals during a CMP operation of a copper thin film on a substrate in accordance with one embodiment of the invention.

FIG. 10 is a graph illustrating two eddy current sensor output signals during a CMP operation of a copper thin film on a substrate in accordance with one embodiment of the invention. Line 210 represents the ECS signal over time of the leading edge of the wafer undergoing the CMP operation. Line 212 represents the ECS signal over time of the trailing edge of the wafer undergoing the CMP operation. It should be appreciated that the region defined between line 214 and 216 removes the topography of the wafer, while the region after line 216 removes the copper overburden from the wafer. Point 210-1 represents the endpoint, i.e., clearing of the copper overburden, of the leading edge of the wafer. Point 212-1 represents the endpoint of the trailing edge of the wafer. One skilled in the art will appreciate that the information gathered from the ECS embedded in the wafer carrier will yield continuous data for determining a removal rate. Additionally, the removal rate variation between the leading edge and the trailing edge can be observed. Where the sensor is embedded in the wafer carrier, the sensor provides continuous real time data as to the thickness of the wafer or a film on the wafer being measured. That is, there is not a window where the sensor takes a snapshot once per revolution of a polishing belt or pad which provides discrete measurements. The embodiments described herein provide continuous measurement and thickness monitoring.

Figure 11A:
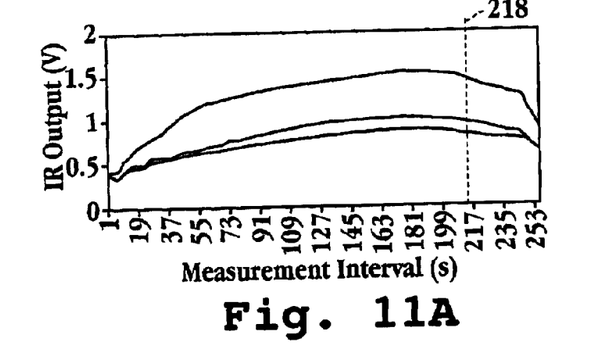
FIG. 11A is a graph of an Infrared (IR) sensor signal measuring the temperature of a polishing belt over time in accordance with one embodiment of the invention.

FIG. 11A is a graph of an infrared (IR) sensor signal measuring the temperature of a polishing belt over time in accordance with one embodiment of the invention. One skilled in the art will appreciate that a silicon substrate is transparent to the infrared signal, therefore, the infrared signal can detect the temperature of the thin film of the wafer being planarized by the surface of the polishing surface. The lines of the graph of FIG. 11A represent the monitoring of the infrared signal at various locations of the belt, such as the center front and back of the belt relative to an operator.

Figure 11B:
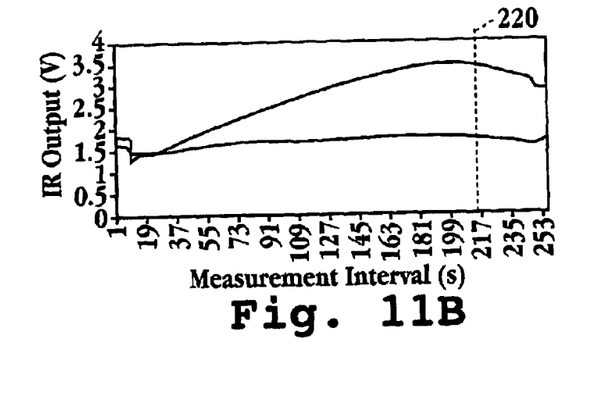
FIG. 11B is a graph of an Infrared signal of the wafer temperature over time in accordance with one embodiment of the invention.

FIG. 11B is a graph of an infrared signal of the wafer temperature over time in accordance with one embodiment of the invention. Here, the wafer temperature is being monitored to monitor temperature variation during CMP process flow. For each of the embodiments of FIGS. 11A and 11B, line 218 and 220, respectively, intersect the response lines of the graphs at the endpoint of the associated processes. That is, the belt temperature and wafer temperature begin to decrease at the endpoint, which is at an inflection point of the curves. In one embodiment, the wafer temperature changes by about 20 degrees Celsius and the belt temperature changes by about 10 degrees Celsius during the processing.

Figure 12:
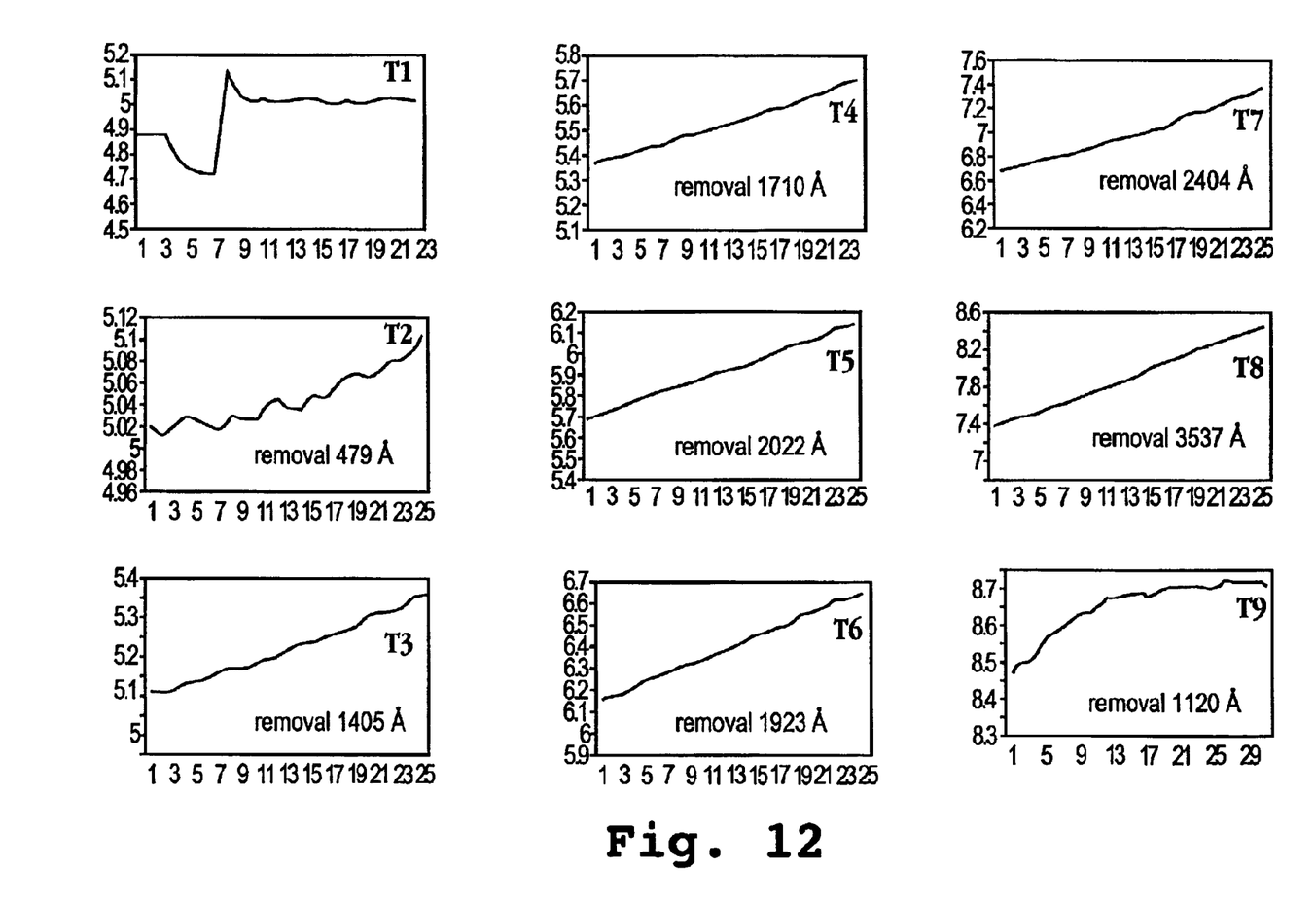
FIG. 12 is a schematic diagram of 30 second time sequences T1–T9 of a CMP process illustrating the removal of a copper film as measured by an eddy current sensor in the wafer carrier in accordance with one embodiment of the invention.

FIG. 12 is a schematic diagram of 30 second time sequences T1–T9 of a CMP process illustrating the removal of a copper film as measured by an eddy current sensor in the wafer carrier in accordance with one embodiment of the invention. Each of time sequences T1–T9 show the ECS signal on the y axis in volts and the time interval in seconds on the x axis. Time sequence T1 illustrates the initiation of the process, while time sequence T2 illustrates the beginning of the removal of the copper film. That is, 479 Å of material is removed in time sequence T2. Time sequences T3–T8 illustrate approximate 30 second periods and the associated amount of material removed during the time sequence. Time sequence T9 illustrates the occurrence of the endpoint condition.

In summary, the present invention provides for the determination of an endpoint of a semiconductor fabrication process, such as a CMP process, through a clustered sensor configuration. The clustered sensors allow for the determination of the endpoint and associated removal or deposition rates by initially determining a thickness of a film on the wafer under non-process conditions. In one embodiment, the thickness of the film being measured is between about 0 microns and 2 microns. The determined thickness is provided to a second sensor associated with the process operation in order to calibrate the sensor so that variables from processing conditions that cause error in the thickness measurement are substantially eliminated. It should be appreciated that while the embodiments have been described in terms of a CMP process, the clustered sensor arrays are not limited to a CMP process. For example, the sensors can be used within any semiconductor process that removes or deposits a layer or film on a substrate, such as etch and deposition processes. The invention has been described herein in terms of several exemplary embodiments. Other embodiments of the invention will be apparent to those skilled in the art from consideration of the specification and practice of the invention. The embodiments and preferred features described above should be considered exemplary, with the invention being defined by the appended claims.

What is claimed is:

1. An apparatus for supporting a wafer during a chemical mechanical planarization (CMP) operation, comprising:

a wafer carrier defined within a housing, the wafer carrier having a bottom surface;

a carrier film affixed to the bottom surface, the carrier film configured to support a wafer during CMP operations;

a sensor embedded in the wafer carrier, the sensor configured to induce an eddy current in the wafer to determine a signal indicating a proximity and a thickness of the wafer as the wafer is forced against a polishing pad, the sensor configured to receive an incoming thickness of the wafer to offset an inaccuracy of the sensor due to both a non-uniformity of the carrier film and polishing pad erosion.

2. The wafer carrier of claim 1, wherein the incoming thickness is determined by an eddy current sensor array in the absence of a third body effect.

3. The wafer carrier of claim 2, wherein the eddy current sensor array includes a single top eddy current sensor and two bottom eddy current sensors.

4. The wafer carrier of claim 1, wherein the sensor is an eddy current sensor.

5. The wafer carrier of claim 1, wherein a bottom surface of the sensor is aligned with a bottom surface of the wafer carrier.

6. The wafer carrier of claim 5, wherein a spacer is placed between the bottom surface of the sensor and the bottom surface of the wafer carrier.

7. The wafer carrier of claim 6, wherein the spacer is composed of a non-conductive material.

8. The wafer carrier of claim 6, wherein the spacer has a thickness between about 1 millimeter (mm) and about 1.5 mm.

9. A system for processing a wafer, comprising:
   a chemical mechanical planarization (CMP) tool, the CMP tool including,
      a wafer carrier defined within a housing, the wafer carrier having a bottom surface having a window defined therein;
      a carrier film affixed to the bottom surface of the wafer carrier, the carrier film configured to support a wafer during CMP operations; and
      a sensor embedded in the wafer the sensor disposed over a top surface of the window, the sensor configured to induce an eddy current in the wafer to determine a proximity and a thickness of the wafer;
   a sensor array external to the CMP tool, the sensor array in communication with the sensor embedded in the wafer carrier, the sensor array configured to substantially eliminate a distance sensitivity, the sensor array configured to provide an initial thickness of the wafer, the initial thickness of the wafer allowing for a calibration to be performed on the sensor embedded in the wafer carrier, the calibration offsetting variables causing inaccuracies in the determination of the thickness of the wafer during CMP operations.

10. The system of claim 9, wherein the sensor array includes a top sensor and a bottom sensor.

11. The system of claim 10, wherein a signal from the top sensor is averaged with a signal for the bottom sensor to determine the initial thickness.

12. The system of claim 9, wherein the variables include non-uniformity of a thickness of the carrier film and pad-wear of a polishing pad of the CMP tool.

13. The system of claim 9, wherein the sensor array includes a top eddy current sensor and two bottom eddy current sensors, an axis for each of the two bottom eddy current sensors being offset from an axis of the top eddy current sensor.

14. The system of claim 13, wherein the sensor array is configured so that a thickness of the wafer is calculated between a top point on the top surface of the wafer and a bottom point on a bottom surface of the wafer, the top point and the bottom point sharing a common vertical axis through the wafer.

15. The system of claim 9 wherein the embedded sensor and sensors of the sensor array are infrared sensors.

16. The system of claim 9, further including:
   a controller in communication with the embedded sensor and the sensor array, the controller configured to determine a thickness of the wafer from a signal provided by either the embedded sensor or the sensor array, the controller capable of providing a thickness profile of both a wafer prior to CMP and a wafer after CMP to a CMP controller.

17. The system of claim 16, wherein the thickness profile of the wafer prior to CMP allows the CMP tool to compensate for the thickness profile.

18. The system of claim 16, wherein the thickness profile after CMP causes the CMP tool to correct process variations detected in the thickness profile.

\* \* \* \* \*